Patented Aug. 12, 1930

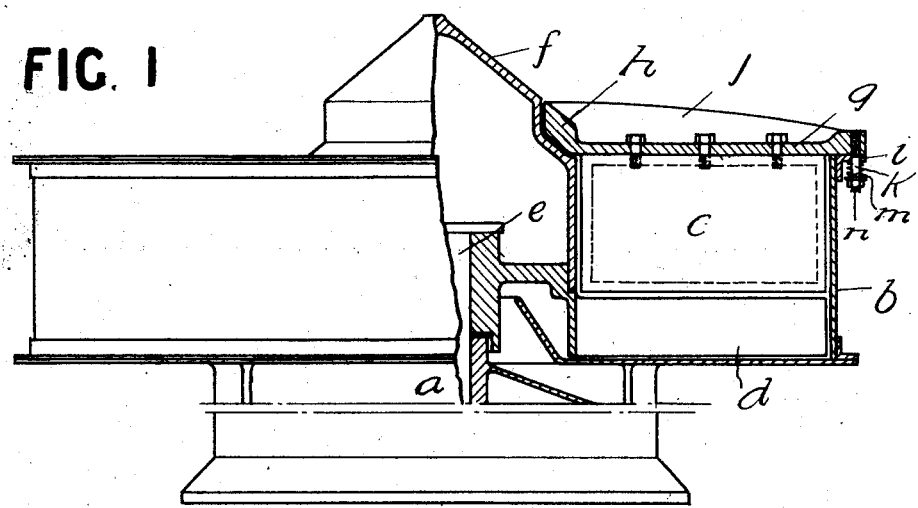
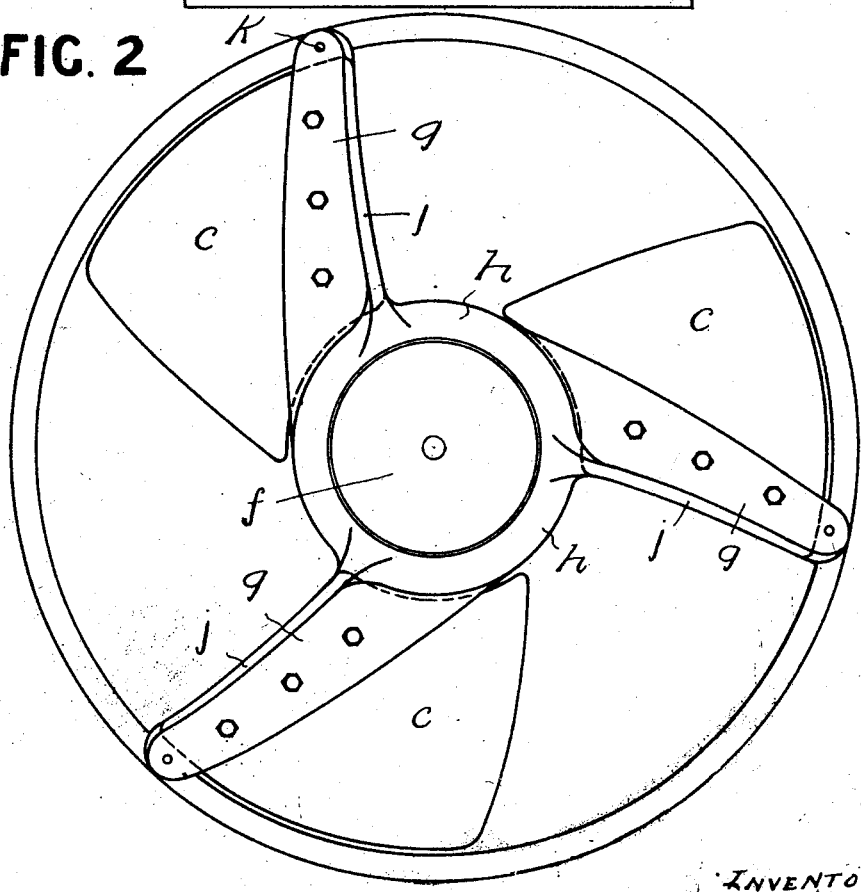

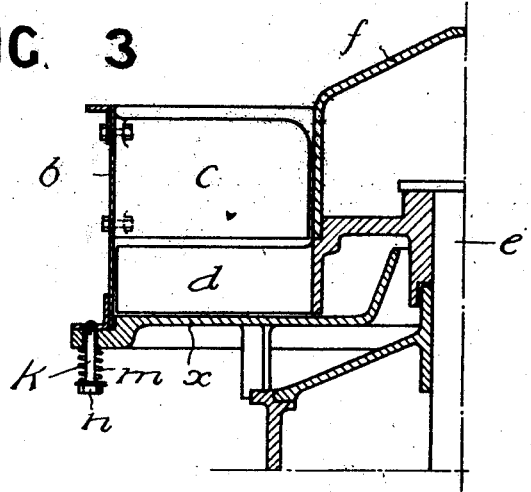
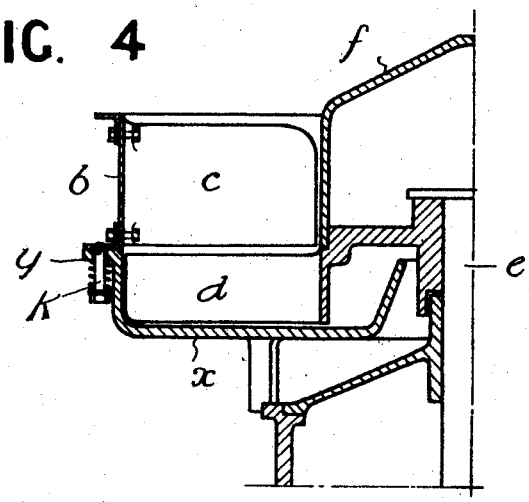

1,772,640

UNITED STATES PATENT OFFICE

ALFRED BARTLETT SMITH AND CLIFFORD ROSS SMITH, OF WOLVERHAMPTON, ENGLAND

APPARATUS FOR TREATING AND MIXING COMMINUTED OR FINELY-DIVIDED MATERIALS

Application filed September 7, 1929, Serial No. 390,914, and in Great Britain August 2, 1929.

This invention refers to apparatus for treating and mixing comminuted or finely divided materials of the kind in which rotating arms, blades or sweeps act in conjunction with fixed, or relatively moving pressure faces or surfaces in a container in order to rub and mix or blend materials placed in the container. In some cases the apparatus may be used to rub and reduce again to a fine state of division dry and friable materials which are in, or contain, lumps, such as bonded foundry sand which has been heated and the bond dried or burnt but in which the sand particles are still holding together.

The object of the present improvement is to provide means for enabling the pressure surfaces to yield to exceptional pressure such as would be imposed upon them, possibly to their damage, in the event of a foreign and relatively large body, such as a piece of scrap iron, coming between them or one of them and the rotary arms, blades or sweeps.

This object is attained by the means illustrated in the accompanying drawings and claimed at the end hereof.

Figure 1 of the drawings is a sectional elevation of one kind of mixing apparatus with the invention applied thereto.

Figure 2, is a plan thereof.

Figure 3, is a fragmentary sectional elevation showing a modification.

Figure 4, is a similar view of a further slight modification.

In these drawings the same reference letters are employed to designate the same parts in the various views.

$a$ is the base or standard of the machine, $b$ is a container pan in which the materials are treated, $c$ are fixed mixing surfaces projecting inwardly from the walls of the pan $b$, $d$ are the rotary mixing blades carried by a vertical shaft $e$, and $f$ is a domed distributing surface arranged over the upper end of the shaft $e$ for spreading the materials as they are charged into the pan.

As shown in Figures 1 and 2, the pressure surfaces $c$ instead of being carried by the pan $b$ are carried by a spider with three limbs $g$ springing from a ring-shaped body part $h$. This body part fits around the dome $f$. Each limb is preferably ribbed or webbed on its upper surface as at $j$, Figure 1, to form a rigid structure and a fixed pressure surface $c$ is secured to each limb by screw pins or like means.

At the extremity of each limb a guide pin $k$ is rigidly secured which projects through an aperture $l$ or sleeve in the lip of the pan $b$. The load of the spider and the pressure surfaces $c$ may be relied on for normally maintaining the parts in working relation, but we prefer to provide for this purpose a stout spring or springs $m$ on each guide pin below the aperture or sleeve bearing against a nut or adjustment abutment $n$. It may be found desirable to incline the guide pins of the spring mountings somewhat, instead of arranging them truly vertical.

By means of this yoke or spider $j$ the fixed pressure member $c$ are carried in the container, and in the event of any exceptional strain, such as would be caused by a relatively large body of a hard substance present in the materials under treatment coming between the rotary blades or sweeps $d$ and a fixed pressure surface $c$, the latter would lift under the strain by raising the corresponding limb $g$ of the spider thus rocking the spider and avoiding damage to the rotary blades, the limb, or pressure surface. The movement of the spider also gives an indication of something unusual occurring which should enable the trouble to be noticed by the attendant operative and removed.

In the example shown at Figures 3 and 4 the unitary means for carrying the fixed pressure surface is the cylindrical wall of the container $b$ which is guided on the fixed base $x$ by the guide pins $k$. In Figure 4 the base $x$ is curved upwardly at the outer periphery and the guide pins $k$ work through a lip $y$ thereon.

Figure 5:
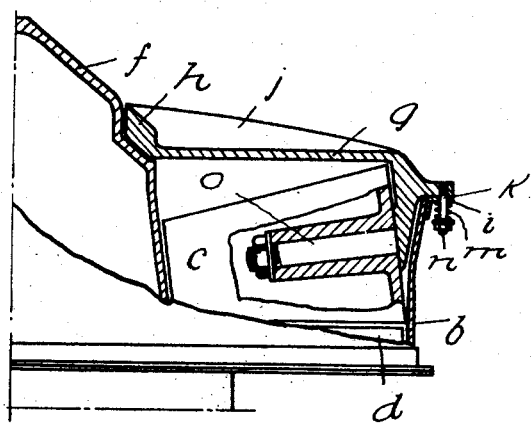
Figure 5, is a fragmentary view similar to Figure 1, but illustrating the invention applied to another type of pressure surface.
Figure 6:
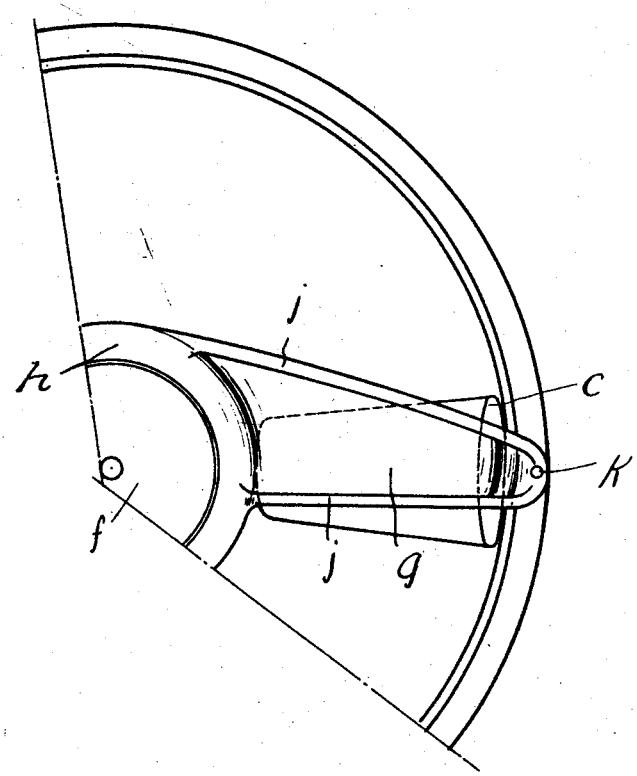
Figure 6, is a plan of Figure 5.

In the example shown in Figures 5 and 6 the invention is applied to a mixing apparatus in which the pressure surface $c$ is a roller. In this case, the roller axle is a stud $o$ integral with or secured to one limb $g$ of the spider.

The guide pin $k$ and spring at the points of attachment of the limbs $g$ to the pan $b$ follow those in the previous example.

We claim:

1. Rotary apparatus for treating finely divided materials comprising a standard, a fixed container base supported on said standard, a container, rotary mixing means in said container and fixed pressure surfaces working in conjunction therewith, said pressure surfaces being carried by a unitary member capable of movement with respect to said base under exceptional load imposed by a block between the said surfaces and the rotary mixing means.

2. Rotary apparatus for treating finely divided materials comprising a container suitably supported, rotary means therein, pressure surfaces for acting in conjunction with said rotary means, a unitary member mounted above the base of the container to which said pressure surfaces are rigidly secured, said member having resilient attachments to a fixed part of the apparatus so as to be capable of yielding movement with respect to the base of the container if the pressure surfaces are subjected to exceptional pressure.

3. Rotary apparatus for treating finely divided materials comprising a container suitably supported, rotary means therein, pressure surfaces for acting in conjunction with said rotary means, a unitary member mounted above said container, said member comprising a spider with a number of limbs to each of which a pressure surface is rigidly secured, guiding means between the extremities of said limbs and a portion of the container, and springs normally holding said spider on said container but being capable of yielding to permit a lifting movement of said limbs to raise the pressure surfaces under exceptional pressure.

4. Rotary apparatus for treating finely divided materials comprising a container suitably supported, rotary means therein, pressure surfaces for acting in conjunction with said rotary means, a domed distributor in the centre of said apparatus to spread the materials charged into the container, a spider member above said container with a body portion encircling said domed distributor, said pressure surfaces being rigidly secured to said spider and said spider being resiliently attached to said container.

5. Rotary apparatus for treating finely divided materials comprising a container suitably supported, rotary means therein, pressure surfaces for acting in conjunction with said rotary means, a distributor in the centre of said apparatus to spread the materials charged into said container, a spider member above said container having a body portion encircling said distributor, limbs projecting from said body portion of the spider to the lip of the container, guiding means between the extremities of the limbs and the lip of the container and springs thereon normally holding the spider on the container and maintaining the pressure surface in operative relation with the rotary means in said container.

6. Rotary apparatus for treating finely divided materials comprising a container suitably supported, rotary means therein, pressure surfaces for acting in conjunction with said rotary means, said pressure surfaces being formed as rollers, a spider arranged above said container, said spider carrying axles for said rollers and further carrying spring loaded guiding means at its attachment points on said container.

7. Rotary apparatus for treating materials in a finely divided state comprising in combination a container and a rigid support therefor, rotary means therein, pressure surfaces for cooperating with the rotary means in the operation of the apparatus unitary means for carrying said pressure surfaces and loading means for maintaining said unitary carrying means and said pressure surfaces normally in operative relation with the rotary means.

8. Rotary apparatus for treating materials in a finely divided state comprising in combination, a fixed containing portion, movable means for mixing said materials, pressure surfaces for cooperating with said movable means, which surfaces are fixed against rotation about the axis of the apparatus but capable of local rotation on axes in a carrier member, said carrier member cooperating with said containing portion to maintain the relative position of the parts, but being capable of yielding movement with respect thereto to relieve dangerous pressure between the moving mixing means and the pressure surfaces.

9. Rotary apparatus for treating materials in a finely divided state comprising in combination a fixed containing portion, rotary sweeps arranged in said containing portion, a shaft for rotating said sweeps, a series of pressure surfaces disposed in a horizontal plane immediately above the path of said sweeps, and a fixed carrier for the pressure surfaces mounted on the fixed containing portion, said fixed carrier having axles on which rollers are arranged to serve as the pressure surfaces.

In testimony whereof we affix our signatures.

ALFRED BARTLETT SMITH.
CLIFFORD ROSS SMITH.